United States Patent [19]
Normann et al.

[11] Patent Number: 5,821,632
[45] Date of Patent: Oct. 13, 1998

[54] ARRANGEMENT, IN PARTICULAR IN VEHICLES, FOR TRANSMITTING ELECTRIC SIGNALS BY CONNECTING LINES

[75] Inventors: Norbert Normann, Niefern-Öschelbrom; Lothar Schulze, Ispringen; Gunter Uhl, Sinsheim; Joachim Ney, Niefern-Öschelbronn, all of Germany

[73] Assignee: Doduco GmbH & Co. Dr. Eugen Durrwachter, Pforzheim, Germany

[21] Appl. No.: 373,206

[22] PCT Filed: Jul. 8, 1993

[86] PCT No.: PCT/EP93/01791

§ 371 Date: Feb. 12, 1996

§ 102(e) Date: Feb. 12, 1996

[87] PCT Pub. No.: WO94/01846

PCT Pub. Date: Jan. 20, 1994

[30] Foreign Application Priority Data

Jul. 8, 1992 [DE] Germany ............... 42 22 320.2

[51] Int. Cl.⁶ .................................................. H01F 38/00
[52] U.S. Cl. .............. 307/10.1; 307/104; 336/DIG. 2; 340/310.07; 364/424.059
[58] Field of Search .................. 307/9.1–10.6, 307/1, 3, 7, 104; 336/DIG. 2, 118–120, 122–124; 340/310.07, 310.02, 310.01, 310.06, 425.5, 426, 825.69, 825.72, 539, 825.3–825.32, 825.73; 364/423.098, 424.045, 424.059; 370/151; 180/287; 343/702

[56] References Cited

U.S. PATENT DOCUMENTS 3,441,887  4/1969  Costa .
3,721,958  3/1973  Dixon .
4,941,258  7/1990  Wright ...................... 302/10.1
5,142,278  8/1992  Moallemi et al. ........... 307/10.1
5,341,280  8/1994  Divan et al. ............. 336/DIG. 2
5,473,200  12/1995  Woo ........................ 307/10.2
5,508,709  4/1996  Krenz et al. ................ 343/702
5,528,086  6/1996  Maass et al. ................ 307/10.5

FOREIGN PATENT DOCUMENTS 0433514  12/1989  European Pat. Off. .
1032846  10/1956  Germany .
2247718   4/1974  Germany .
3908982   3/1989  Germany .
2215893   9/1989  United Kingdom .

OTHER PUBLICATIONS

(Rudi, et al) 06 Nov. 1984 2 572 845–A1 no translation.
(Hirrlinger) Dec. 04, 1990 DE 4011941 no translation.
(Bertot) Jun. 11, 1984 FR 8416881 no translation.

Primary Examiner—Richard T. Elms
Attorney, Agent, or Firm—Dvorak & Orum

[57] ABSTRACT

Electric low current signals are transmitted through two-wire circuits having coaxial connectors which are closed by windings that are coupled transformer-like to the coaxial connectors. This arrangement allows transmission of control signals for electric power consuming devices within automobile doors, low frequency audio signals, and electrical power to power the electric consumers. All signals are transmitted on a common data cable. Control signals are in binary coded form, modulated onto a carrier signal, as are modulated, low frequency audio signals. The signals are demodulated in a door module and separated according to frequency. The low frequency audio signals are amplified and transmitted to a loudspeaker. The control signals are processed by a microprocessor controller in conjunction with switching units that create corrective actions for the power consuming devices located in the door.

25 Claims, 9 Drawing Sheets

ARRANGEMENT, IN PARTICULAR IN VEHICLES, FOR TRANSMITTING ELECTRIC SIGNALS BY CONNECTING LINES

BACKGROUND OF THE INVENTION

Automobile doors nowadays accommodate quite a number of electric devices which must be supplied with direct current and electric control signals, e.g. window lifters, adjustable exterior mirrors, exterior mirror heating, hazard light, door lock contacts, contacts for indoor lighting, loud speaker, central lock, possibly also operating unit for an electric sun roof. Using conventional circuitry up to 40 wires are required to cover these needs. This presents, however, a considerable problem when mounting the doors and renders door repairs more difficult, since the wires must not only be installed, partly in the door and partly in the rest of the automobile body, but also in the automobile frame and, by means of a flexible cable harness, into the respective door.

Additionally, most wires conduct a load current and must therefore have a sufficiently large cross-sectional area. Considering the fact that the number of electric wires in automobiles has strongly increased in the past years (a modern medium-sized automobile contains approximately 1000m cable), automobile manufacturers have in the meantime serious problems to accommodate the extensive cable harnesses in the automobile.

Additionally, with increasing number of cables the number of coaxial connectors required to enable the mounting and dismounting of a door increases also. Most of the break downs in the automobile electronics and electric are due to contact problems of the coaxial connectors of the harnesses. Contact problems are facilitated by moisture and aggressive substances penetrating into the coaxial connectors, especially in automobiles. Especially information cables with small signal currents are frequently affected, since, unlike in coaxial connectors conducting load currents, virtually no self cleaning of contact surfaces occurs.

The objective of the present invention is to reduce the susceptibility to break downs brought on by the increasing extend of wiring.

According to the invention electric signals are transmitted by coaxial connectors with transformer-like coupling. It follows that by doing so not only are all contact problems in coaxial connectors eliminated, but simultaneously it becomes possible to drastically reduce the extend of wiring, since alternating current signal is required for the transformer-like signal transmission in coaxial connectors and same can be utilized as carrier signal which can be modulated for not only one but several different signals to be transmitted to the door. Fundamentally one two-wire circuit only is sufficient to transmit all occurring signals to the door. For this purpose one part of the coaxial connector is affixed to the automobile door and the other part of the coaxial connector to another part of the automobile body. This way reliable signal transmission is possible into automobile doors which are rotatable supported on hinges, since, if the coaxial connector is mounted on that side of the door which is affixed on the car frame, then the two parts of the coaxial connector remain in predetermined, closely spaced configuration, also during swivel movements of the door, guaranteeing intensive coupling. It is even possible to configure one of the door hinges itself as a coaxial connector. For signals which are transmitted inductively into the door, electric wires between door and automobile frame are not needed, facilitating wiring significantly and significantly improving ease of door repair.

According to the invention not only control signals can be transmitted for power consuming devices located in the door and their corrective action elements, but also low frequency signals from a car radio or another audio installation in the automobile to a loud speaker located in the door. For this purpose the low frequency signals as well as control signals are modulated onto an alternating current carrier signal, which is in turn transmitted inductively in the coaxial connector and from which control signals and low frequency signals can be restored through demodulation using an application specific circuit located in the door (door module). A particular advantage of the invention is the fact that not only weak control signals and low frequency signals can be transmitted in this way, but also electric power required for the actuation of power consuming elements, so that no wire connection at all is required between door and automobile frame. The carrier signal can be for the transmission of electric power by choosing a sufficiently high amplitude to correspond with the required power demand of approximately 50 W; if one takes the carrier signal from the demodulator to a rectifier, then the latter can serve as a power source for the power consuming elements, which also receive the control signals.

Several electric power consuming devices are usually located in the door, as is the case in mid-size and luxury class automobiles, necessitating that several control signals to be transmitted to the door. The control signals are best modulated as a serial data bus onto the common carrier signal for transmission to the door, where they are separated according to frequencies into low frequency-, audio- and control signals and then transmitted to their predetermined power consuming devices.

Transmitting control signals in the form of a serial data bus is already known in automotive technology, for example in electronic motor control, but not yet for transmitting control signals into a door. According to the invention not only a serial data bus is utilized, but same is combined with coaxial connectors in which low frequency signals, especially audio signals, are transmitted inductively and for this purpose modulated onto a common carrier. For this purpose a bus control equipment is required in the automobile and exterior to the door, that generates and transmits the modulated carrier signal, and in the door is required an application specific circuit, hereafter named door module, in which the signal is demodulated and separated into control signals and low frequency signals. The door module supplies the power consuming devices in the door.

It can occur that a door is equipped with switches and other operating elements which actuate power consuming devices not located in the same door but outside the door or in a different door. Thus, the exterior rear view mirror on the passenger door can be adjusted and/or the central lock can be actuated. It is envisaged that in an advantageous further development of the invention control signals, generated in one door for electric power consuming devices outside the door, are also modulated onto the carrier signal and then inductively transmitted from the door to another door module, preferably via a bus control equipment which is connected with all door modules. In this way bi-directional data transmission between door modules and the central bus control device is possible, bi-directional only for the control signals, of course, but not for the low frequency audio signals, for which bi-directional transmission is not needed.

There are several possibilities for the selection of the carrier signal and the modulation method. One can use, for example, a sinusoidal or sinusoidal-like alternating current signal, preferably with a frequency between 80 kHz and 120 kHz, onto which low frequency signals (frequency range approx. 30 Hz to 18 kHz) can be modulated. For the transmission of binary coded control signals, one can in this case preferably also use frequency modulation and one can modulate onto the carrier signal two discrete frequencies, preferably above the frequency band used for audio transmission, representing symbols "0" and "1".

Modems in the form of integrated circuits transmitting signals as serial data bus according to a carrier frequency method are commercially available and are suitable for the purpose of the invention.

Another advantageous possibility is the use of a rectangular carrier signal. If a rectangular carrier signal is rectified in the door, a direct voltage is obtained, gap free in the ideal case, which can be utilized, without great effort, for the electric power supply of the power consuming devices in the door. In this case the carrier signal serves a twofold function: (1) it serves as information carrier and (2) it transmits energy, which is needed by the power consuming devices in the door in order to function. Thus, a separate cable for energy transmission can be omitted.

The rectangular carrier signal can be frequency modulated or also amplitude modulated, but preferably will be pulse-width modulated for transmission of low frequency audio signals. The maximum modulation needed for this to work can be obtained, for example, by adjusting the pulse-width-factor between 0.7 and 1.3. Further, when using the rectangular carrier signal a frequency of between 80 kHz and 120 kHz for the carrier signal is preferred. Then the sample frequency is approximately 10 times the audio frequency (which is low frequency), which is more than sufficient for trouble free low frequency transmission. The high sample frequency makes a particularly simple modulation and demodulation possible.

In case of a rectangular carrier signal the binary coded control signals are preferably superimposed on the carrier signal by amplitude modulation. For this purpose the rectangular voltage pattern of the carrier signal is used during one period as a "blank frame" for a bit to be transmitted of a series of bits. Thus, as will be described below, coding of four different states in every transmission period is easily achieved. The two parts of the inductive coaxial connector, by means of which the signals are transmitted into the door, are preferably configured similar to a hinge or form a door hinge, which, as a third door hinge, is situated between the two load bearing door hinges, preferably, however, replaces one of the load bearing door hinges, and thus has not only a load bearing but also an inductive transmission function. This version of the invention is particularly economic and easy to mount.

A coaxial connector configured as a hinge is, for all practical purposes, a transformer whose primary winding is affixed to the automobile frame and whose secondary winding is affixed to the door, enclosing its ferromagnetic hinge pin, which is projected into a ferromagnetic yoke affixed to the frame and which closes the magnetic winding between primary winding and secondary winding. In order for the hinge pin to serve not only its magnetic task but also its load bearing mechanical task as a hinge pin, it consists of a longitudinally slotted tube made from non-magnetic steel, e.g. from V2A, and contains a soft magnetic core. It is another possibility to form the hinge pin from a metal band with low losses made from an amorphous material. The yoke best consists of a ferrite but can also consist of an amorphous material.

The invention is not limited to transmitting signals into an automobile door, but can be applied whenever low current signals are sent from a transmitter by means of a two-wire circuit to a receiver and a coaxial connector is provided which can have contact problems. The transmitter can be, e.g. a control device, a signal emitter or a switching device which switches an electric power source. The receiver can be an arbitrary electric power consumer, e.g. a control motor or another control device, a signal emitter, a loud speaker, a switching device or a controllable sensor.

In all these cases signals can be transmitted from transmitter to receiver via two-wire circuits which are closed by windings and coupled by transformer-like coupling, but not through direct contact between electric contact pairs. Besides the application in automobiles the invention can also be applied in construction machinery, land and air vehicles. Stationary possibilities of deployment are given in household, process and machine control technology.

Care is to be given to providing sufficient inductive coupling between windings which close the two-wire circuits to be connected. This is accomplished by connecting the two winding, as already known, with a magnetic flux conductor made from ferromagnetic material, especially ferrite, in that the two windings are assembled on a ferrite core. Preferably the coaxial connector contains a divided magnetic flux conductor, with one part situated in one part of the coaxial connector with at least one winding, and the other part of the magnetic flux conductor situated in the other part of the coaxial connector with at least one winding, whereby the two parts of the magnetic flux conductor combine into one core, preferably with magnetic closure on the outside of the winding.

It is an essential advantage of the invention that both parts of the coaxial connector can be configured equally.

Changing the orientation of the winding on the core changes the signal polarity. This may be advantageous in certain applications. In those cases were the signal polarity is predetermined, the shape of the flux conductor, the winding and the winding body are designed such that the winding can be passed over the magnetic flux conductor in one orientation only.

Using the coaxial connector, according to the invention, not only two but more than two two-wire circuits can be connected with each other, by configuring the coaxial connector such that on the flux connector in one and/or the other part of the coaxial connector not only one each but two each or more than two each windings can be assembled. Thus one can build very simple branches, but also redundant signal wire systems, the latter, for example, as follows: two two-wire circuits, each having a winding on either end and the two windings on one end of each circuit are engaged on one common core, and the other two windings on the opposite end of each circuit are engaged on a second common core.

The required inductive coupling between the two coaxial connector parts according to the invention does not necessarily require that the two magnetic flux conductor parts, one inside each of the two coaxial connector parts, make contact with each other when the two coaxial connector parts are joined together, but there may be a gap between the two causing losses. The gap does not have to be an air gap, but it may be filled with a non-magnetic, electrically insulating material, e.g. a plastic material. This is realized in a configuration of the coaxial connector where the two parts are not penetrating into each other and/or are not transmitting any forces to each other, e.g., a design where each of the two parts has a plane surface which face each other when the two parts are strapped together. We consider such a configuration a coaxial connector also. The outer strap could be, e.g. a shrinkable plastic which would not only keep the two parts of the coaxial connector together, but would also seal them against penetration of dust and moisture. Application examples are shown on attached sketches. Identical or corresponding parts are shown with the same reference numbers.

DETAILED DESCRIPTION OF THE DRAWINGS

DETAILED DESCRIPTION OF THE PREFERRED EMBODIMENT

Figure 1:
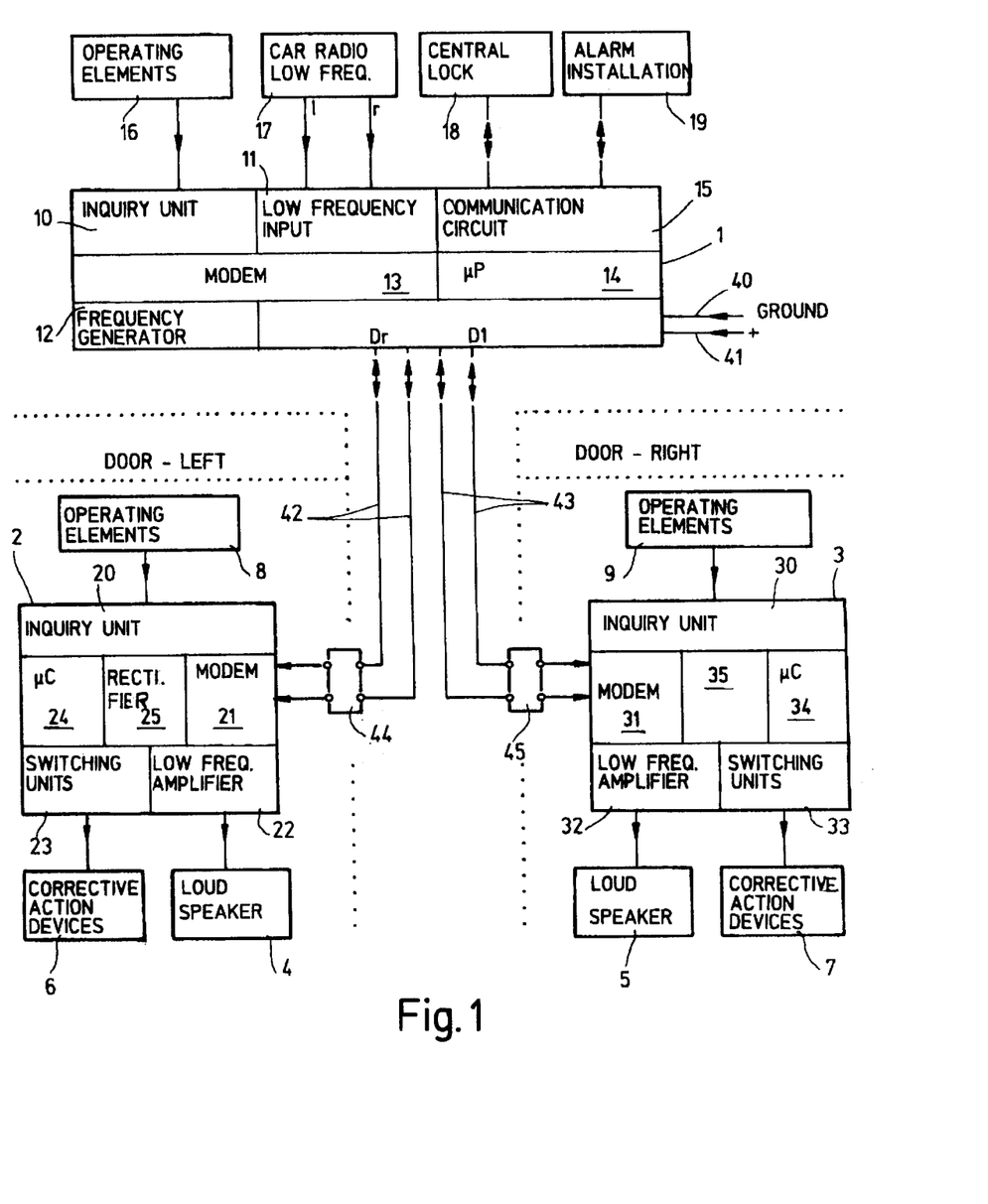
FIG. 1 is a block diagram of a circuit for energy transmission by means of a carrier signal.

The circuit in FIG. 1 contains a bus control equipment 1, which is located in the vehicle exterior to the doors, e.g. behind the dash board, and a door module 2 in the left door and a door module 3 in the right door. Both doors contain loud speakers 4 and 5, respective and corrective action devices 6 and 7, for different power consumers, especially for adjusting the exterior mirrors, for window lifters and for the central lock. Moreover, each door is equipped with various respective operating elements 8 and 9.

The bus control equipment 1 contains an inquiry unit 10 for interrogating switch positions and other operating elements 16 located exterior to doors, a circuit 11 connected with car radio 17 for feeding in low frequency signals coming from two channels (right and left stereo channel), a frequency generator 12 for generating an alternating voltage carrier signal with a frequency of approximately 100 kHz, a modulator/demodulator 13 (modem), a microprocessor 14 controlling the sequence of operations in the bus control equipment and a circuit 15 for the exchange of information between bus control equipment 1 and a central locking mechanism 18 and an alarm installation 19.

The door modules also contain an inquiry unit 20 and 30, resp., for interrogating the switch positions and other operating elements in the respective door, a modulator/demodulator 21 and 31, a low frequency amplifier 22 and 32, switching units 23 and 33, for converting demodulated control signals into corrective action signals for corrective action devices 6 and 7, of electric power consuming devices, located in the respective door, a micro controller 24 and 34, which controls the actions in door module 20 and 30, and a rectifier 25 and 35, resp., in order to produce a direct current through rectifying the carrier signal for supplying energy to the electric power consuming devices.

The bus control equipment 1 is connected to a power source (vehicle battery) by means of a ground wire 40 and a voltage carrying wire 41. A data wire pair 42, connected to data port D1 of bus control equipment 1, leads to the left door through a coupler 44, and a data wire pair 43, connected to data port Dr, leads to the right door through a coupler 45.

Figures 17, 18:
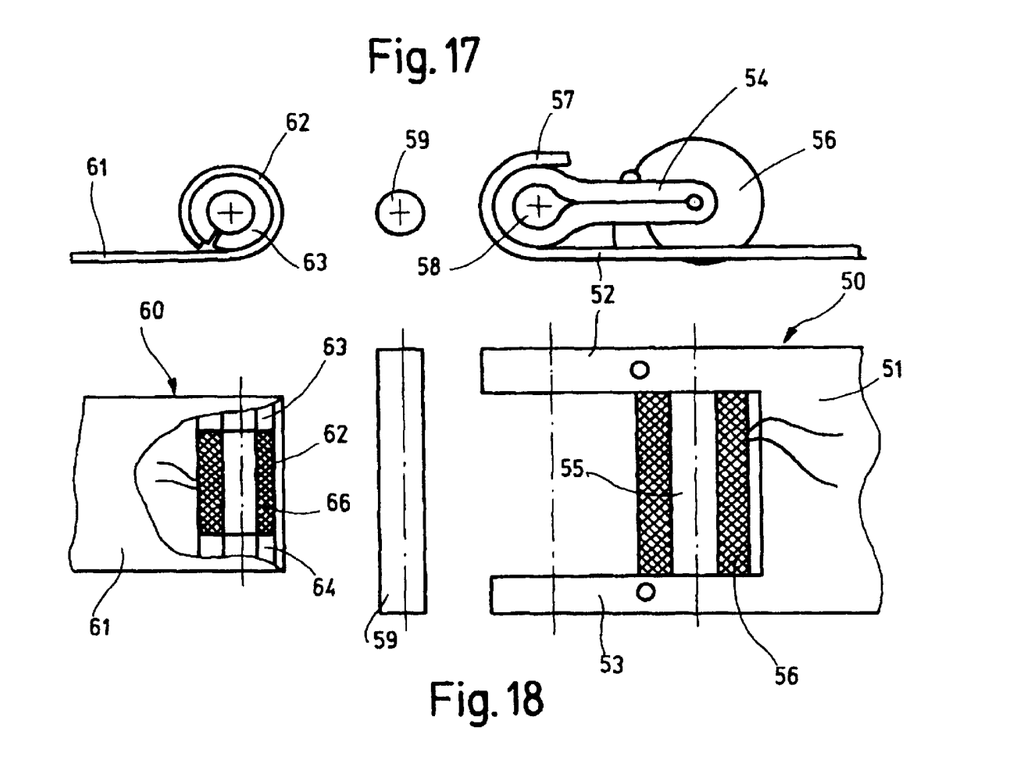
FIG. 17 shows in plan view the parts of an inductive coaxial connector configured as a door hinge.
FIG. 18 shows the elements of the coaxial connector from FIG. 17 in side view, partly in cross-section.

Couplers 44 and 45 are coaxial connectors configured as door hinges and are constructed as shown in FIGS. 14 and 18. One half of the door hinge 50 has a fork shaped sheet metal base plate 51 with poor magnetic flux capability, e.g. made from V2A steel, and is connected to the car frame. Affixed to each of the two extensions 52 and 53 of base plate 51 is a yoke 54, made from a ferromagnetic material, e.g. from a ferrite or an amorphous metal. The yokes are connected with each other in their one end by a cylindrical ferromagnetic core 55 which has an electric winding 56 on it. Each extension 52 and 53 is bent into a hook 57 which is dimensioned to house the other end of yoke 54 which, in turn, contains a transverse round hole 58 to suit hinge pin 59 which preferably consists of a tube, slotted longitudinally, and is made from a non-magnetic material (e.g. V2A steel) with a soft magnetic core which simultaneously serves as core for another electric winding 66 which is situated in the second half 60 of the hinge. The second half of the hinge consists of a sheet metal base plate 61 with poor magnetic flux capability and is affixed to the door. The sheet metal base plate 61 is bent into an almost closed cylindrical bushing 62 which contains winding 66. In order to shield winding 66 somewhat from mechanical forces transferred from hinge pin 59, steel bearings 63 and 64 are provided at both ends of the winding 66 which, together with winding 66, form one unit and, in order to avoid a short circuit winding, are slotted longitudinally.

When mounting the door, one half 60 of hinge is inserted into the fork-like hinge part 50, so that round hole 65 in winding 66 is aligned with round hole 58 in yoke 54 whereupon pin 59 is inserted into holes 58 and 65 connecting the two halves of the hinge together. Pin 59 transmits mechanical forces mostly to bearings 63 and 64. After the door is mounted the two windings 56 and 66 are coupled by a magnetic circuit consisting of the two yokes 54, the core 55 and pin 59 together forming a transformer with primary winding 56 and secondary winding 66.

The circuit works as follows:

Inquiry unit 10 contained in bus control equipment 1 cyclically interrogates operating elements 16 assigned to it; binary coded control signals, containing the positions of interrogated operating elements, are being modulated by modem 13 onto the carrier signal which is supplied by frequency generator 12, and, depending on the coded destination, transmitted either into the right door or into the left door or into both doors. If car radio 17 is switched on, then the low frequency signals coming from the car radio and to be sent to door loud speakers 4 and 5 are fed into the bus control equipment 1 and are also modulated onto the carrier signal by modem 13, whereby, in the case of stereo signals, the left channel is transmitted by means of data wire pair 42 to door module 2, and the right channel by means of data wire pair 43 to door module 3. In case of mono low frequency signals, the same low frequency signals are being transmitted through data wire pairs 42 and 43.

Signals arriving in door modules are demodulated in modems 21 and 31, and separated according to frequency. The low frequency signals are amplified through low frequency amplifiers 22 and 32, and transmitted to door loud speakers 4 and 5, The demodulated control signals are evaluated by micro-controller 24 and 34, and control the various corrective action elements 6 and 7, by means of switching units 23 and 33. The carrier signal after rectified in rectifier 25 and 35, supplies direct current for the operation of the power consuming devices in the door. The inquiry units 20 and 30 in the two door modules 2 and 3, cyclically interrogate the position of operating elements 8 and 9, located in the same door and supply binary coded control signals containing the positions of the interrogated operating elements. The micro controller 24 and 34, checks whether the interrogated operating element belongs to a corrective action element in the same door or to a corrective action element outside the door.

If it belongs to a corrective action element in the same door, then the corrective action element is controlled directly by the corresponding controller, without going back to bus-control equipment 1, through switching unit 23 and 33. If for example, the interrogated operating element 8 in the left door belongs to a corrective action element 7 in the right door, then the binary coded control signal, delivered by inquiry unit 20, is modulated in modem 21 onto the carrier signal, transmitted to bus control equipment 1, demodulated there, evaluated, again modulated onto the carrier signal and transmitted into the right door, demodulated there in modem 31 and then actuates corrective action device 7 via switching unit 33.

Bus control equipment 1 can furthermore receive signals from, e.g. the trunk lock which is a part of the central lock 18, and pass them on to the two door modules 2 and 3. Furthermore signals can be transmitted via bus control equipment to an alarm installation 19 and back from the alarm installation to door modules 2 and 3.

Figure 2:
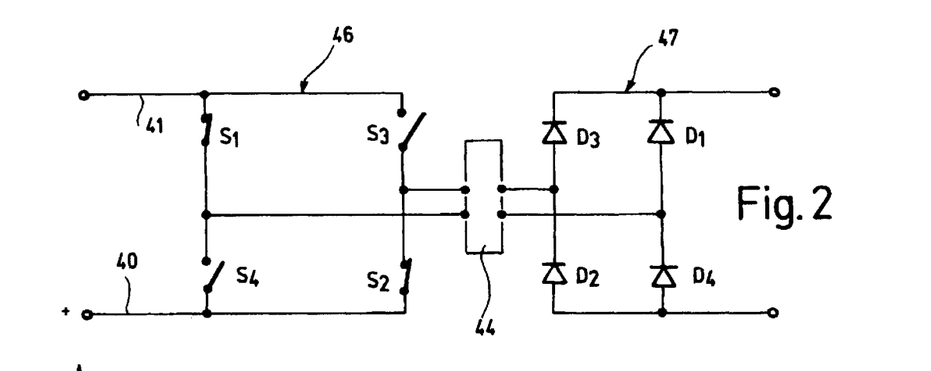
FIG. 2 shows, as detail to block diagram of FIG. 1, a circuit for energy transmission by means of the carrier signal.
Figure 3:
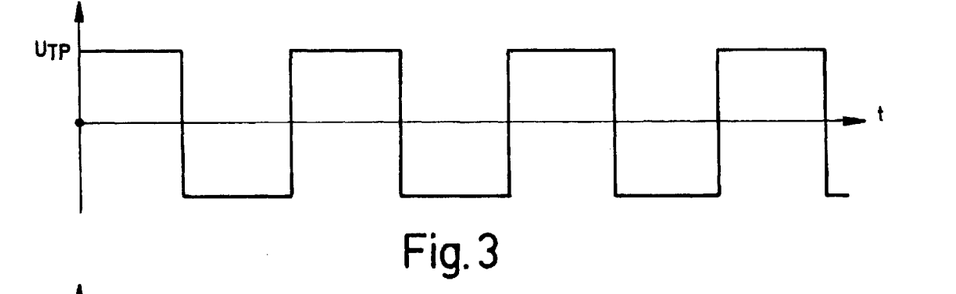
FIG. 3 shows corresponding voltage as function of time of a rectangular carrier signal on the primary winding of a transformer.
Figure 4:
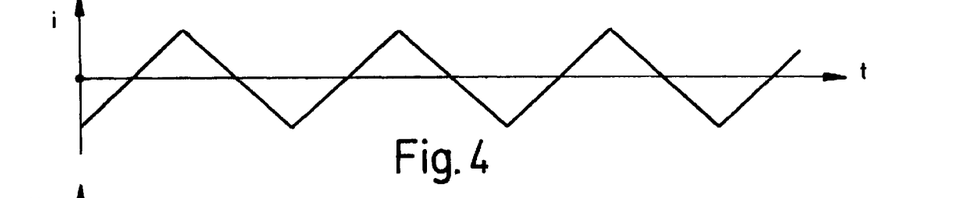
FIG. 4 shows the current as function of time of the carrier signal.
Figure 5:
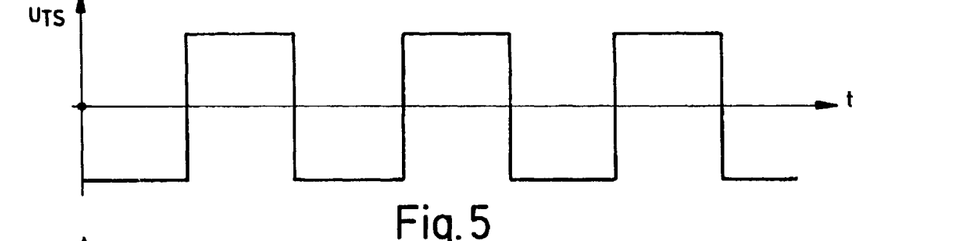
FIG. 5 shows the corresponding voltage as function of time of the carrier signal on the secondary winding of the transformer.
Figure 6:
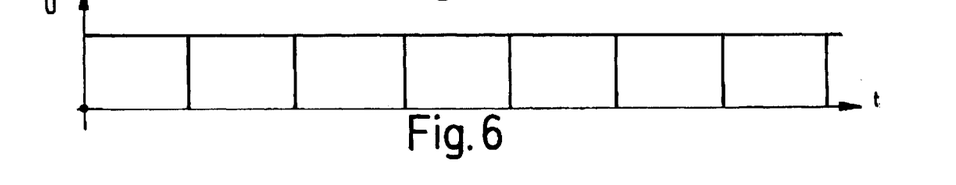
FIG. 6 shows direct voltage, gained through rectifying the carrier signal shown in FIG. 5, for the supply of electric power consumers in the door.

As to the carrier signal, preferably a high frequency rectangular alternating voltage signal is utilized, as depicted in FIG. 3. Such a carrier signal can be easily generated from the voltage of a battery located in the car by a bridge circuit 46 depicted in FIG. 2. Four fast electronic switches S1, S2, S3 and S4 are connected together to form a bridge 46 which is powered through wires 40 and 41 from the vehicle battery. Either switches S1 and S2, or switches S3 and S4 are closed, and this setting alternates so that the rectangular voltage depicted in FIG. 3 appears at the contacts of coaxial connector 44 which is a transformer. By virtue of the rectangular form of the alternating voltage signal, a constant voltage is generated at the primary winding 56 of the transformer, in the ideal case creating a linearly increasing current (FIG. 4) and producing a constant flux change in core 55, 59. The constant flux change creates a constant secondary voltage (FIG. 5). By continuously changing the polarity of the primary voltage Utp (FIG. 3) a triangular current in time (FIG. 4) and a secondary rectangular alternating voltage Uts (FIG. 5) is generated, which is rectified in door module 2 (or 3) by a rectifier bridge 47 consisting of diodes D1 to D4, resulting in a direct voltage shown in FIG. 6, which is gap free in the ideal case. The extent of smoothing of this direct voltage is limited to bridging the needle shaped voltage breakdowns caused by the finite slope of the pulse edge. The current flux angle and through it the transformer efficiency is much better than for a sinusoidal primary voltage. Rectifier bridge 47 serves as a power source for electric power supply to power consuming devices in the door.

Figure 7:
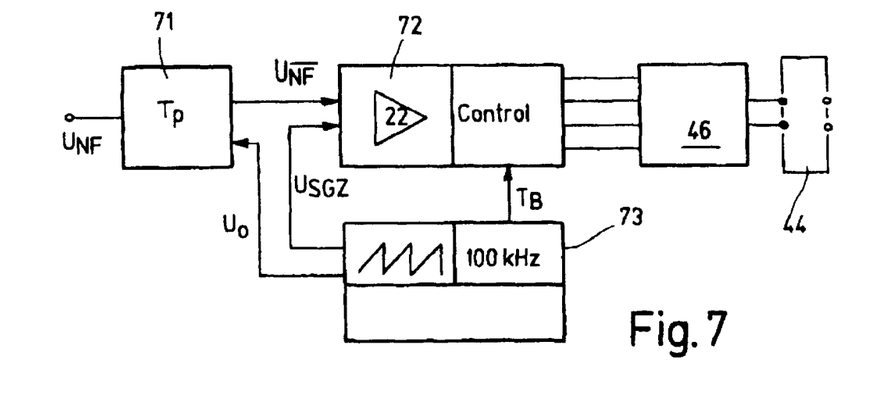
FIG. 7 shows, as detail to block diagram shown in FIG. 1, a circuitry in block diagram representation for the transmission of a low frequency audio signal.
Figure 8:
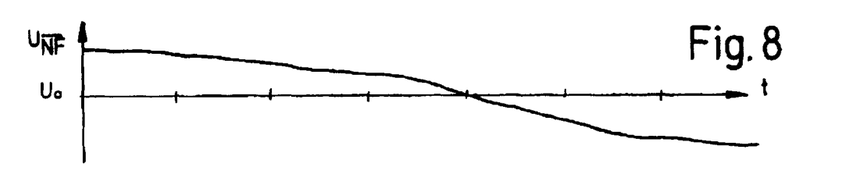
FIG. 8 shows a low frequency audio signal as a function of time.
Figure 9:
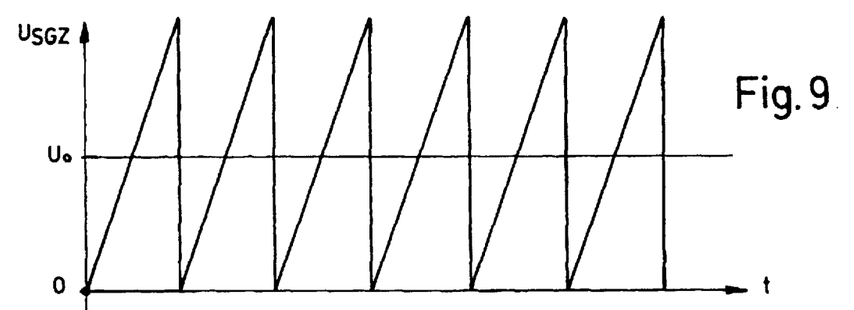
FIG. 9 shows a saw tooth voltage with which the low frequency audio signal shown in FIG. 8 is scanned.

The transmission of a low frequency signal can be achieved through modulation of the pulse duty factor of the rectangular carrier signal depicted in FIG. 3 which, for this purpose, preferably has a frequency of 100 kHz, as an order of magnitude. The circuit shown in FIG. 7 illustrates this point further. The low frequency signal is passed through a low pass filter 71, thereby limiting its band width and amplitude, and a constant direct voltage Uo is added for the purpose of setting a suitable working point. The resulting low frequency direct voltage signal Unf is shown in FIG. 8. Between low pass filter 71 and bridge circuit 46 (see FIG. 2), control circuit 72 is placed. The latter controls the setting of switches S1 and S2, and S3 and S4, resp., contained in bridge circuit 46. A timing generator 73 provides a 100 kHz timing signal. For example, at one particular time switches S1 and S2 are closed and switches S3 and S4 are open; the rate at which said switches change their setting is 100 kHz. The exact point in time within one period of the timing generator at which switches S1 and S2, and S3 and S4, are actuated is determined through scanning of signal shown in FIG. 8 by saw tooth voltage Usgz shown in FIG. 9. The latter is generated by timing generator 73 which, has an amplitude of 2Uo with no polarity change, and a 100 kHz frequency. The saw tooth voltage Usgz is compared with the low frequency voltage Unf in control circuit 72.

The comparison begins with each period of the timing generator 73; as soon as the saw tooth voltage reaches the actual voltage Unf, bridge circuit 46 changes polarity; when the new period of the timing generator begins bridge circuit 46 again changes polarity. Thus, the magnitude of amplitude Unf is coded into the pulse duty factor.

Figure 10:
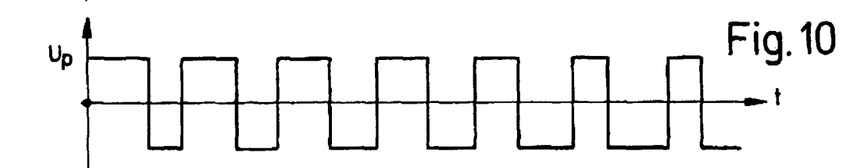
FIG. 10 shows the pulse-width modulated rectangular signal on the primary winding of the transformer gained from scanning the low frequency audio signal.
Figure 11:
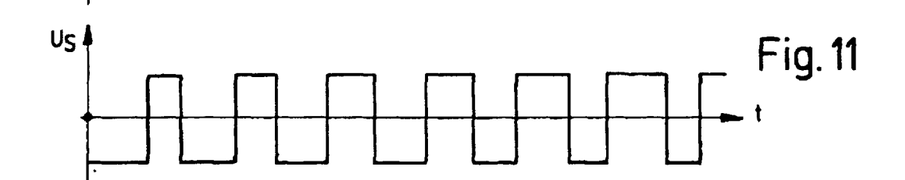
FIG. 11 shows the corresponding pulse-width modulated rectangular signal on the secondary winding of the transformer.
Figure 12:
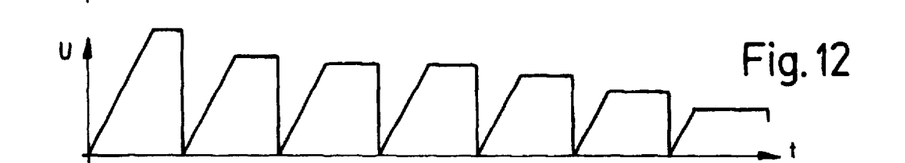
FIG. 12 shows a sequence of direct current pulses which are obtained through circuit shown in FIG. 14 and whose amplitude reflects the pulse duty factor of the rectangular signal shown in FIG. 11.
Figure 13:
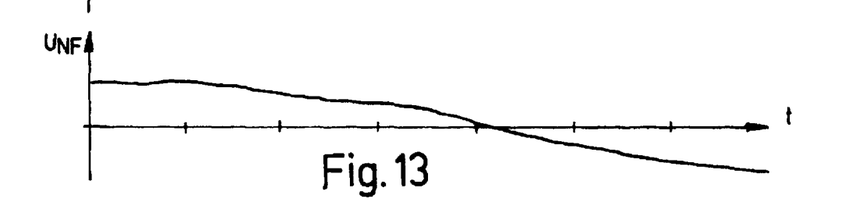
FIG. 13 shows the low frequency audio signal which was restored from signal shown in FIG. 12 by low pass filtering.
Figure 14:
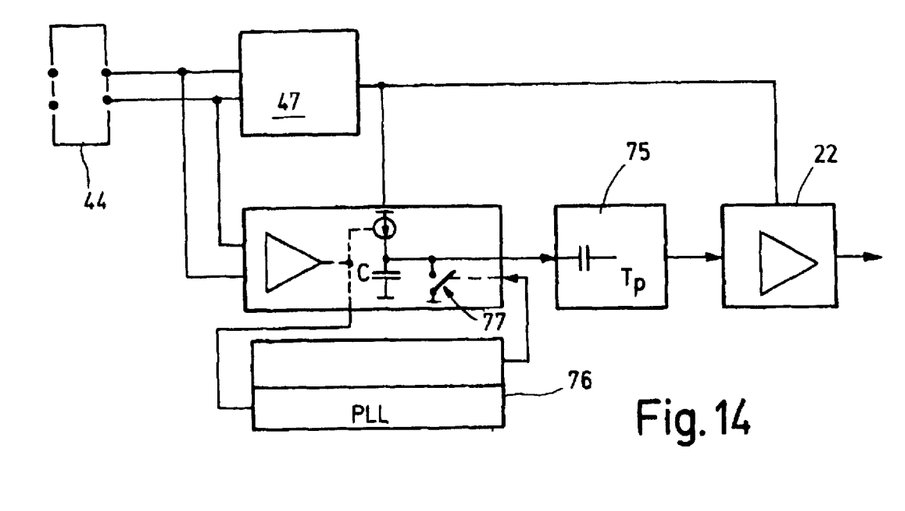
FIG. 14 shows as detail to FIG. 1 a circuit which receives and processes the pulse-width modulated signals shown in FIG. 10.

The pulse width modulated signal is transmitted into the door through coupling 44 which is configured as a transformer. The circuit of door module 2 inside the door is shown in FIG. 14 and comprises bridge circuit 47 (see FIG. 2), a circuit 74 for converting the pulse duty factor, a low pass filter 75, a low frequency amplifier 22 and a phase-locked control circuit 76. The pulse duty factor converter 74 determines the sign of the pulse-width modulated rectangular voltage and, when voltage is negative, switches a power source from bridge circuit 47 to the pulse duty factor converter to a capacitor C, which is then being charged for as long as the negative portion of the rectangular voltage (FIG. 11) persists; concurrently the voltage in the capacitor C increases linearly (FIG. 12) then remains constant until capacitor C is discharged at the beginning of each 100 kHz cycle by an electronic switch 77. The phase-locked control circuit is locked onto the working frequency of 100 kHz of the system and transmits to the pulse duty factor converter 74 the required control signals, by which capacitor C is discharged at the beginning of each 100 kHz cycle. The voltage as function of time on capacitor C is shown in FIG. 12 and represents a sequence of impulses whose amplitude is determined by the pulse duty factor of the pulse-width modulated rectangular voltage in FIG. 10 and 11. The voltage Uc on capacitor C is composed of the low frequency signals, the system frequency of 100 kHz, upper harmonics of the system frequency and a direct voltage portion; it is sent to an AC-coupled low pass filter of higher order 75, which separates out the low frequency content and passes same to the low frequency amplifier 22, which finally feeds the loud speaker. The low frequency amplifier 22 is supplied with power by bridge circuit 47 also. The low frequency signal sent to low frequency amplifier 22 is shown in FIG. 13.

Figure 15:
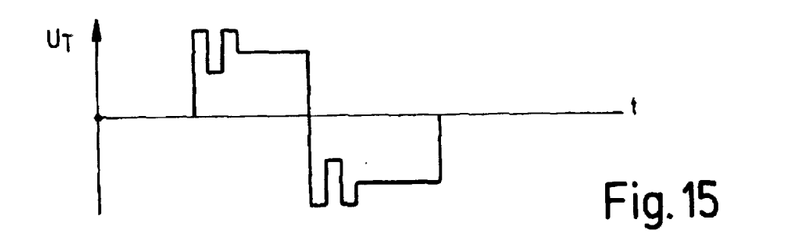
FIG. 15 shows a carrier signal modulated for transmission of binary coded control signals.

Commands and status information is transmitted in the form of a sequence of binary coded signals (data telegram). For this purpose the period of the carrier signal Ut (see FIG. 3) is used as a "blank frame" for a bit of the serial data telegram to be transmitted. If this "blank frame" is marked after every status change, then it is possible to code four statuses in every transmission period—as shown in FIG. 15:

| | | | |
|---|---|---|---|
| 1. marking 1 | not present, | marking 2 | not present |
| 2. marking 1 | present, | marking 2 | not present |
| 3. marking 1 | not present, | marking 2 | present |
| 4. marking 1 | present, | marking 2 | present |

In order to increase transmission reliability the given code range can be used redundantly:

| No transmission: | | | |
|---|---|---|---|
| 1. marking 1 Logic "1": | not present, | marking 2 | not present |
| 2. marking 1 Logic "0": | present, | marking 2 | not present |
| 3. marking 1 Start-Stop-Bit: | not present, | marking 2 | present |
| 4. marking 1 | present, | marking 2 | present |

Figure 16:
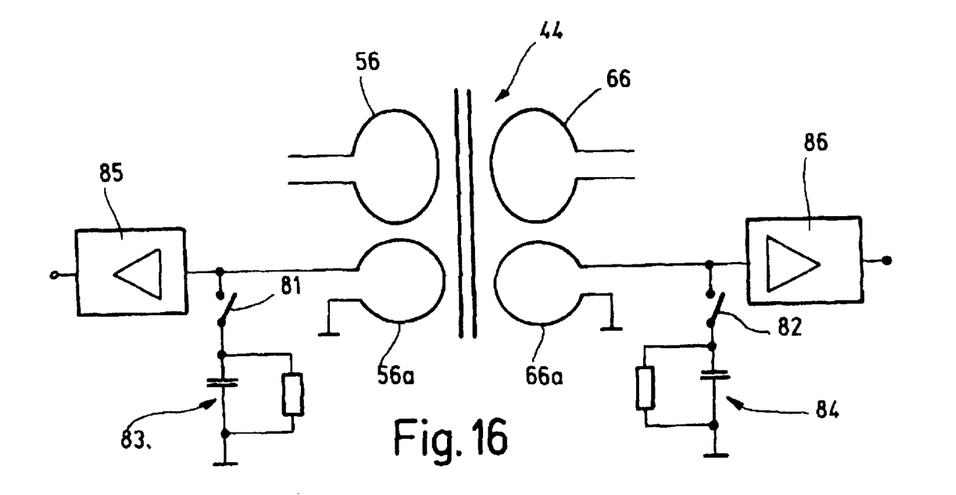
FIG. 16 shows as detail to FIG. 1 a circuit for the transmission of binary coded control signals.

Such markings can be superimposed on the rectangular impulses in modem 13 (FIG. 1) in the form of a high frequency signal with a frequency of several MHz (high frequency burst) and modem 21 and 31, in door module 2 and 3, restores the transmitted data telegram. For the transmission of the data telegram one can utilize the circuit depicted in FIG. 16 where the coaxial connector is configured as a transformer and apart from the primary main winding 56 and the secondary main winding 66, has additionally on the same core a primary supporting winding 56a and a secondary supporting winding 66a. The supporting windings 56a, 66a can be connected, by means of a switch 81 and 82, with a RC combination 83, 84 to form a damped oscillating circuit. Moreover, each supporting winding 56a, 66a is equipped with an oscillation detector 85, 86. If a pulse edge is to be marked in the manner shown in FIG. 15, then the oscillating circuit is closed on the transmitter side and excited to damped oscillations in the transformer by the pulse edge. This oscillation is transmitted to the opposite side of the transformer and is passed on to the oscillation detector 85 and 86, via the open winding, from which the data telegram can be restored from the output signal.

Figure 19:
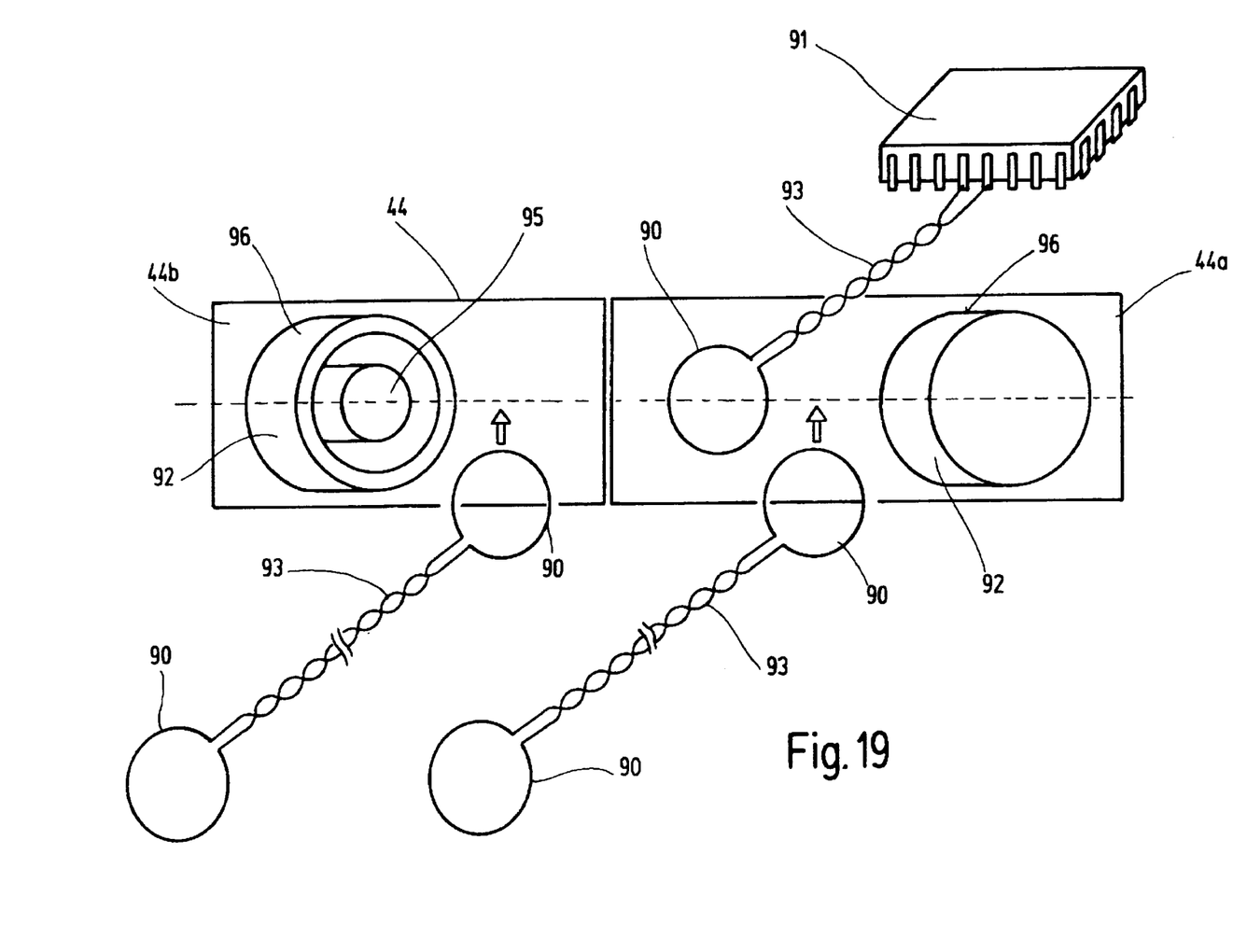
FIG. 19 shows schematically a transmission installation with inductive coaxial connectors for other applications.

FIG. 19 shows a transmission installation with modem 91, e.g. a FSK-modem, as a transmitter. Modem 91 transmits signals, modulated onto a carrier signal, to a receiver which is not shown. The signal transmission is accomplished by means of twisted two-wire circuits 93, which are coupled to each other by means of an inductive coaxial connector. A first two-wire circuit 93 is connected to modem 91 and is closed on the other end by a winding located in the coaxial connector 44. Two more twisted two-wire circuits 93 are connected to coaxial connector 44 and each is closed on either end by a winding. Two of theses windings are positioned in the coaxial connector 44 and the other two windings 90, located outside the coaxial connector 44, can be part of other similar coaxial connectors.

Figure 20:
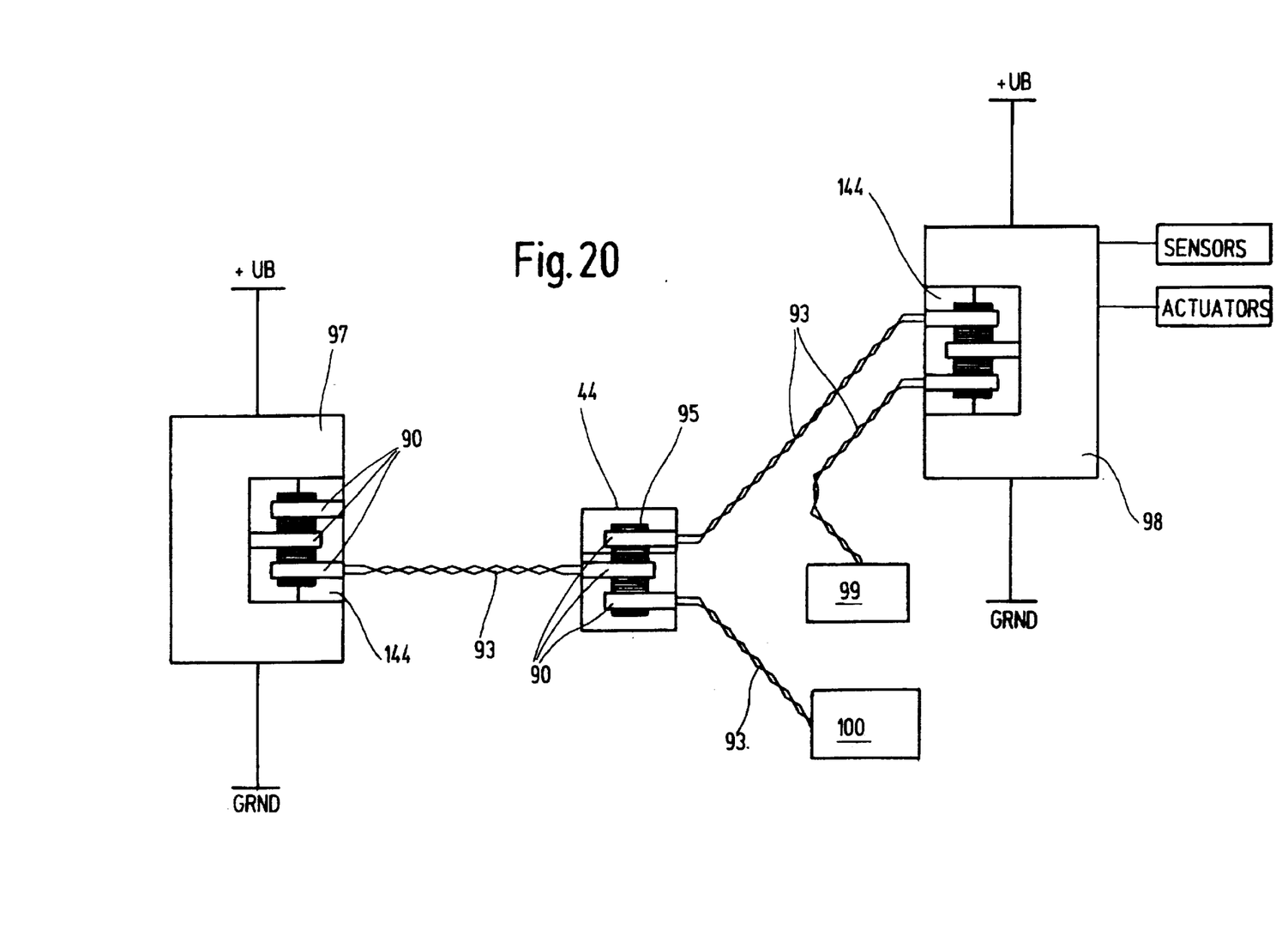
FIG. 20 shows a transmission system with inductive coaxial connector allowing branching.

Essential elements contained in the coaxial connector, represented only schematically, are the three windings 90, two ferrite shells 92 with cylindrical core 95 and cylindrical housing 96. When the two parts 44a and 44b are joined together, the two half shells 92 form an essentially closed hollow cylindrical flux conductor with a core 95. By virtue of the fact that one two-wire circuit leads into and two two-wire circuits exit from the coaxial connector, branched cable systems can be constructed. An example, shown in FIG. 20, shows an inductive coaxial connector, whose ferrite core 95 is equipped with three windings 90. A first two-wire circuit leads to a first module 97 where it connects to an inductive coaxial connector 144, similar to coaxial connector 44, whereby a part of coaxial connector 144, similar to an equipment jack, is part of module 97 and the other part of coaxial connector 144 is connected to the end of two-wire circuit 93. Correspondingly, a second two-wire circuit 93, extending from coaxial connector 44, leads to a second module 98 which, in turn, may be connected to sensors and actuators. In the second module 98 further branching takes place by means of a two-wire circuit 93 connected to coaxial connector 144 and leading to another module or equipment 99. Finally, a third two-wire circuit connected to coaxial connector 44 leads to a fourth module or equipment 100.

Branching as demonstrated in module 98 is also possible in module 97.

Figure 21:
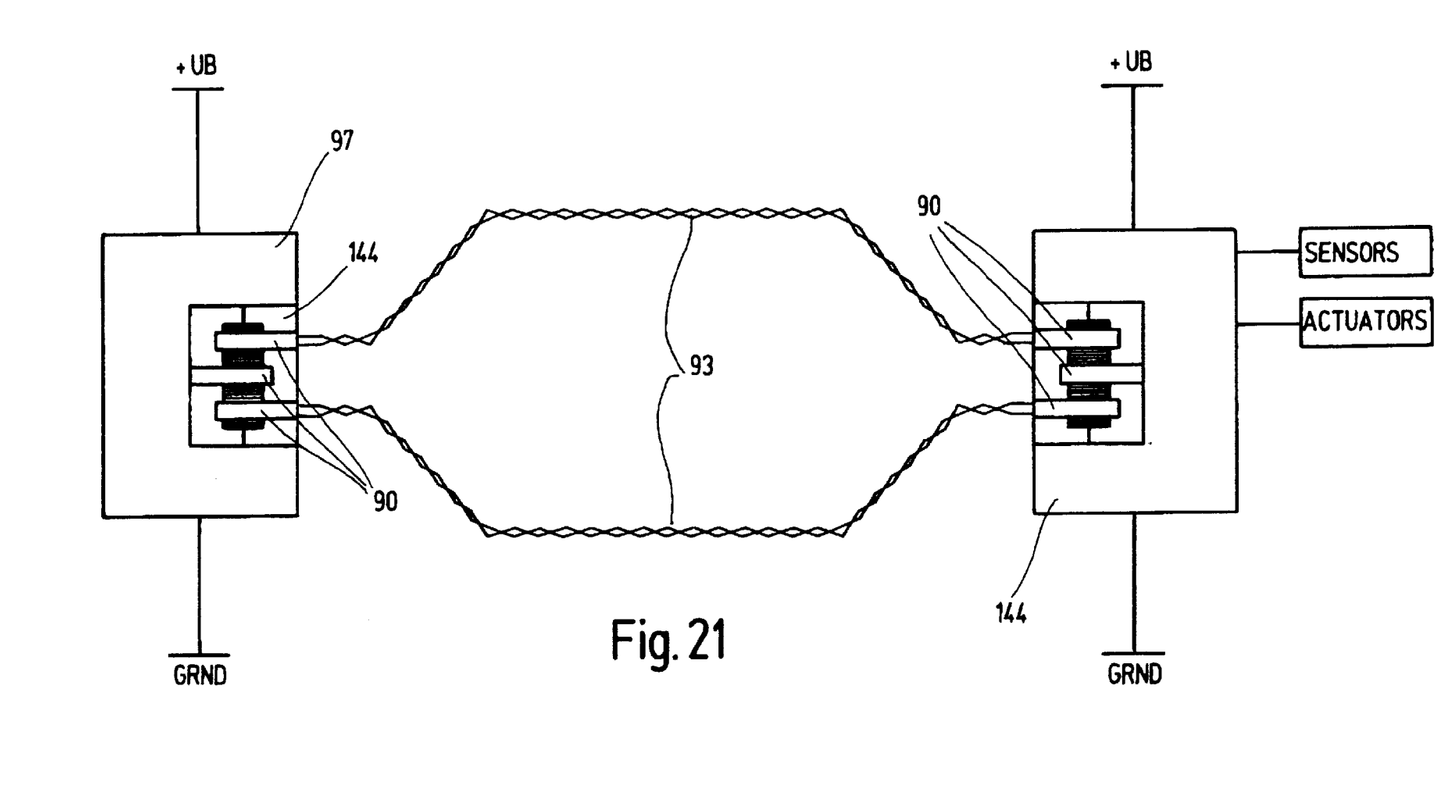
FIG. 21 shows a transmission system with inductive coaxial connectors and redundant cables.

FIG. 21 shows a redundant cable connection between two modules 97 and 98 which are connected with each other, by means of two coaxial connectors 144 each having two ports and two parallel two-wire circuits 93. If one signal path through one of the two-wire circuits 93 is blocked, then the other signal path via the other two-wire circuit is still available for transmission.

Figure 22:
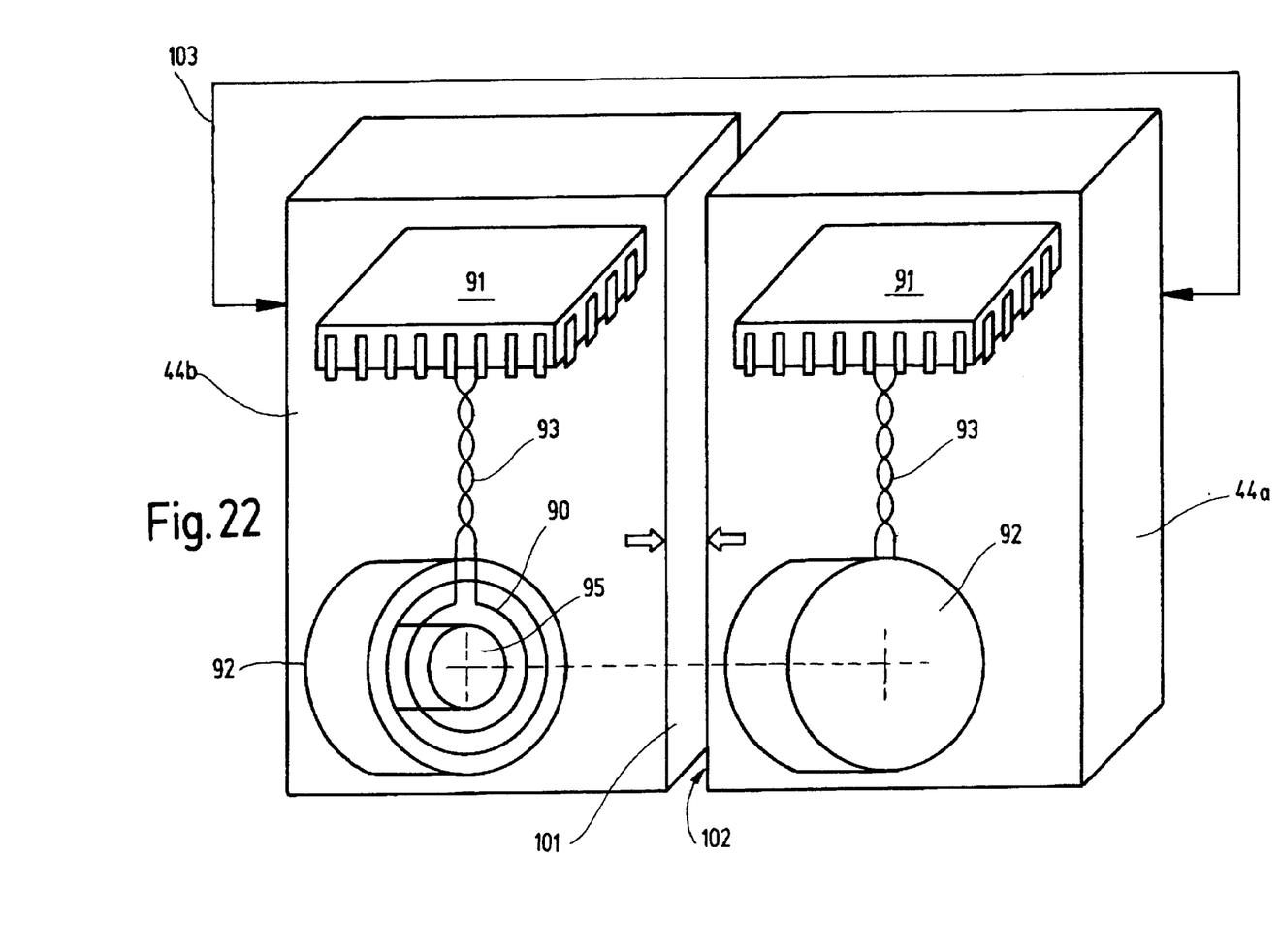
FIG. 22 shows a transmission installation with an inductive coaxial connector whose two parts have plane faces that are facing each other when joined together.

FIG. 22 shows a connector composed of two identical parts each of which contains a modem 91 connected by means of a twisted two-wire circuit 93 to a winding 90 which is embedded inside a cylindrical magnetic flux conductor 92, open on one side, with a core 95. The open ends of the two magnetic flux conductors 92 face each other, and are closely positioned behind the plane housing surfaces 101 and 102. When the two housing surfaces 101 and 102 are in full contact with each other, then the two flux conductors 92 are separated by a layer of plastic, the building material of the housing, through which magnetic flux can penetrate. The two parts 44a and 44b of the connector are held together by an outer device, e.g. by a clamp or shrink sleeve, as indicated by double arrow 103.

Utilizing the transmission installations shown in FIGS. 19 to 22, daisy-chain bus structures for the serial transmission of data can be constructed. The topological system arrangement can correspond to all known serial bus systems. The information can be transmitted using any method based on the modulation of the carrier frequency, i.e. carrier frequency method, for example, the FSK method (Frequenz-Shift-Kodierung). The transmission of data telegrams can occur in both directions; when using the FSK method, however, not at the same time (half-duplex). Using other carrier frequency methods a full duplex method can be realized. A particular advantage is the fact that branches (bus nodes, FIG. 20) and redundant bus systems (FIG. 21) can be realized with ease, as long as the two bus branches do not exhibit significant signal phase shift.

We claim:

1. An apparatus for the transmission of low current electric signals through cables of a vehicle from a transmitter to a receiver by means of two-wire circuits which said circuits contain at least one coaxial connector for separating said transmitter from said receiver, said two-wire circuits closed by transformer-like windings coupled in the coaxial connector, wherein the two wires of the two-wire circuit are twisted into each other.

2. An apparatus for the transmission of low current electric signals through cables of a vehicle from a transmitter to a receiver by means of two-wire circuits, which said circuits contain at least one coaxial connector for separating said transmitter from said receiver, said transmitter including a frequency generator for generating a carrier signal, a modulator for modulating signals onto the carrier signal, said signals to be transmitted to the receiver, said receiver including a demodulator for restoring signals by demodulation, wherein said carrier signal is a rectangular one.

3. An apparatus for the transmission of low current electric signals through cables of a vehicle from a transmitter to a receiver by means of two-wire circuits, which said circuits contain at least one coaxial connector for separating said transmitter from said receiver, said transmitter including a frequency generator for generating a carrier signal, a modulator for modulating signals onto the carrier signal, said signals to be transmitted to the receiver, said receiver including a demodulator for restoring signals by demodulation, wherein the modulator is a frequency modulator.

4. An apparatus for the transmission of low current electric signals through cables of a vehicle from a transmitter to a receiver by means of two-wire circuits, which said circuits contain at least one coaxial connector for separating said transmitter from said receiver, said transmitter including a frequency generator for generating a carrier signal, a modulator for modulating signals onto the carrier signal, said signals to be transmitted to the receiver, said receiver including a demodulator for restoring signals by demodulation, wherein the modulator is a pulse-width modulator in order to transmit low frequency audio signals.

5. An apparatus for the transmission of low current electric signals through cables of a vehicle from a transmitter to a receiver by means of two-wire circuits, which said circuits contain at least one coaxial connector for separating said transmitter from said receiver, said transmitter including a frequency generator for generating a carrier signal, a modulator for modulating signals onto the carrier signal, said signals to be transmitted to the receiver, said receiver including a demodulator for restoring signals by demodulation, wherein the receiver further includes a rectifier as a power source for the supply of the receiver which rectifies the carrier signal.

6. Apparatus as set forth in claim 5 in which, signals are binary coded and transmitted on the carrier signal as a serial data form.

7. An apparatus for the transmission of low current electric signals through cables of a vehicle from a transmitter to a receiver by means of two-wire circuits, which said circuits contain at least one coaxial connector for separating said transmitter from said receiver, said transmitter including a frequency generator for generating a carrier signal, a modulator for modulating signals onto the carrier signal, said signals to be transmitted to the receiver, said receiver including a demodulator for restoring signals by demodulation, wherein said signals are binary coded and transmitted on the carrier signal in serial data form, wherein an amplitude modulator is provided which modulates the binary signals onto the carrier signal through amplitude modulation.

8. The apparatus as set forth in claim 7, wherein the amplitude modulator is one of an impulse generator and a frequency generator whose output signal is added to the carrier signal.

9. An apparatus for the transmission of low current electric signals through cables of a vehicle from a transmitter to a receiver by means of two-wire circuits, which said circuits contain at least one coaxial connector for separating said transmitter from said receiver, said transmitter including a frequency generator for generating a carrier signal, a modulator for modulating signals onto the carrier signal, said signals to be transmitted to the receiver, said receiver including a demodulator for restoring signals by demodulation, in which modems are provided serving as the modulator as well as the demodulator enabling carrier signal transmission in both directions.

10. An apparatus for the transmission of low current electric signals through cables of a vehicle from a transmitter to a receiver by means of two-wire circuits, which said circuits contain at least one coaxial connector for separating said transmitter from said receiver, said transmitter including a frequency generator for generating a carrier signal, a modulator for modulating signals onto the carrier signal, said signals to be transmitted to the receiver, said receiver including a demodulator for restoring signals by demodulation, wherein low frequency audio signals, for a loud speaker are also modulated onto the carrier signal, and are separated from other signals according to frequency at the receiver, and amplified, and sent to the targeted receiver, such as a loud speaker.

11. An apparatus for the transmission of low current electric signals through cables of a vehicle from a transmitter to a receiver by means of two-wire circuits, which said circuits contain at least one coaxial connector for separating said transmitter from said receiver, said transmitter including a frequency generator for generating a carrier signal, a modulator for modulating signals onto the carrier signal, said signals to be transmitted to the receiver, said receiver including a demodulator for restoring signals by demodulation, wherein a frequency between 80 kHz and 120 kHz is chosen as a frequency of the carrier signal.

12. An apparatus for the transmission of low current electric signals through cables of a vehicle from a transmitter to a receiver located within said vehicle by means of two-wire circuits, which said circuits contain at least one coaxial connector for separating said transmitter from said receiver, said two-wire circuits closed by transformer-like windings coupled in the coaxial connector, wherein said transmitter includes a frequency generator for generating a carrier signal, and a modulator for modulating signals onto the carrier signal, said signals to be transmitted to the receiver, said receiver including a demodulator for restoring signals by demodulation, wherein said modulator modulates electric signals for a plurality of receivers onto said same carrier signal, wherein the receivers are located in a door of said automobile, the transmitter is located elsewhere in the automobile and, in the area where the door is rotatably affixed to the automobile frame with hinges, one part of the coaxial connector is affixed to the door and another part of the coaxial connector is affixed to the automobile body.

13. The apparatus as set forth in claim 12, wherein a bus control equipment is provided for the supply of several electric power consuming devices in the door with electric control signals and for the supply of another power consuming device, such as a loud speaker with low frequency audio signals, and that the bus control equipment contains an inquiry unit for interrogating the position of one of the switches and operating elements located exterior to the door and a microprocessor for controlling the sequence of operations in the bus control equipment, whereby the modulator receives the low frequency signals and modulates them onto the carrier signal and receives control signals from the inquiry unit and modulates them onto the carrier signal in serial data form, and that the demodulator located in the door receives signals from the bus control equipment, demodulates them and separates them into control signals and low frequency signals.

14. An apparatus for the transmission of low current electric signals through cables of a vehicle from a transmitter to a receiver located within said vehicle by means of two-wire circuits, which said circuits contain at least one coaxial connector for separating said transmitter from said receiver, said two-wire circuits closed by transformer-like windings coupled in the coaxial connector, wherein said transmitter includes a frequency generator for generating a carrier signal, and a modulator for modulating signals onto the carrier signal, said signals to be transmitted to the receiver, said receiver including a demodulator for restoring signals by demodulation, wherein said modulator modulates electric signals for a plurality of receivers onto said same carrier signal, wherein the receivers are located in a door of said vehicle, the transmitter is located elsewhere in the automobile and in the area where the door is rotatably affixed to the automobile frame with hinges, one part of the coaxial connector is affixed to the door and another part of the coaxial connector is affixed to the automobile body, the coaxial connector has two parts, wherein the two parts of the coaxial connector are penetrating each other the way the two parts of a door hinge penetrate each other.

15. The apparatus as set forth in claim 14, wherein the coaxial connector is a hinge.

16. The apparatus as set forth in claim 15, wherein the receivers are located in an automobile door, the transmitter is located elsewhere in the automobile and, in the area where the door is rotably affixed to the automobile frame with hinges, one part of the coaxial connector is affixed to the door and another part of the coaxial connector is affixed to the automobile body.

17. The apparatus as set forth in claim 14, wherein the coaxial connector is a transformer having a primary and secondary winding whose primary winding is affixed to the automobile body exterior and whose secondary winding is affixed to the door and encloses a ferromagnetic hinge pin which projects into a ferromagnetic yoke said yoke is affixed to the automobile body.

18. The apparatus as set forth in claim 17, wherein the hinge pin consists of a longitudinally slotted tube made from non-magnetic steel with a soft magnetic core.

19. The apparatus as set forth in claim 14, wherein a bus control equipment is provided for the supply of several electric power consuming devices in the door with electric control signals and for the supply of another power consuming device, such as a loud speaker with low frequency audio signals, and that the bus control equipment contains an inquiry unit for interrogating the position of one of the switches and other operating elements located exterior to the door and a microprocessor for controlling the sequence of operations in the bus control equipment, whereby the modulator receives the low frequency signals and modulates them onto the carrier signal and receives control signals from the inquiry unit and modulates them onto the carrier signal in serial data form and that the demodulator located in the door receives signals from the bus control equipment, demodulates them and separates them into control signals and low frequency signals.

20. An apparatus for the transmission of low current electric signals through cables of a vehicle from a transmitter to a receiver located within said vehicle by means of two-wire circuits, which said circuits contain at least one coaxial connector for separating said transmitter from said receiver, said two-wire circuits closed by transformer-like windings coupled in the coaxial connector, wherein said transmitter includes a frequency generator for generating a carrier signal to the receiver and a modulator for modulating signals onto the carrier signal, said receiver including a demodulator for restoring signals by demodulation, wherein said modulator modulates electric signals for a plurality of receivers onto said same carrier signal, and the transmitter includes a bus control equipment for supplying the receiver with signals and a microprocessor for the control of a sequence of operations in the bus control equipment so that the modulator modulates the signals in serial data form onto the carrier signal for transmission by means of the two-wire circuit through the coaxial connector, wherein the bus control equipment provides power consuming devices in the door with electric control signals and supplies another power consuming device such as a loud speaker with low frequency audio signals, the bus control equipment containing an inquiry unit for interrogating the position of one of switches and other operating elements located exterior to the door and a microprocessor for controlling the sequence of operations in the bus control equipment, whereby the modulator receives the low frequency signals and modulates them onto the carrier signal and receives control signals from the inquiry unit and modulates them onto the carrier signal in serial data form, and the demodulator located in the door receives signals from the bus control equipment, demodulates them and separates them into control signals and low frequency signals.

21. The apparatus as set forth in claim 20, wherein the demodulator in the door is a part of a door module circuit, said door module circuit also containing a low frequency amplifier for the low frequency signals and switching units for converting control signals into corrective action signals.

22. The apparatus as set forth in claim 21, wherein the door module is a micro controller provided for evaluating the demodulated control signals and for controlling switching units.

23. The apparatus as set forth in claim 20, wherein the bus control equipment is connected with several door modules.

24. The apparatus as set forth in claim 23, wherein the door module also includes an inquiry unit which interrogates the position of switches and other operating elements located in the door, and also a modulator for modulating control signals received from the inquiry unit onto the carrier signal, and wherein in the bus control equipment, a demodulator unit is provided in which the modulated signal transmitted from the coaxial connector and the door module is demodulated in order to restore the control signals, wherein the microprocessor transmits the signal to switching units for converting the control signals for use in corrective action elements exterior to the doors, and to the modulator for transmission to another door module.

25. A door hinge swivel joint having a first and second half, said joint used for the wireless transmission of electric signals and electrical currents, said swivel joint configured as a transformer, whose primary winding is part of one half of the hinge and whose secondary winding is part of the other half of the hinge.

* * * * *